(12) United States Patent
Fowler

(10) Patent No.: US 7,432,968 B2
(45) Date of Patent: Oct. 7, 2008

(54) CMOS IMAGE SENSOR WITH REDUCED 1/F NOISE

(75) Inventor: Boyd A. S. Fowler, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 839 days.

(21) Appl. No.: 10/842,303

(22) Filed: May 10, 2004

(65) Prior Publication Data

US 2005/0248673 A1 Nov. 10, 2005

(51) Int. Cl.
H04N 3/14 (2006.01)
H04N 5/335 (2006.01)
H04N 5/217 (2006.01)

(52) U.S. Cl. ........................ 348/308; 348/241
(58) Field of Classification Search ................. 348/241, 348/302, 308
See application file for complete search history.

(56) References Cited

U.S. PATENT DOCUMENTS

| 6,559,719 B2 | 5/2003 | Sakuragi | |
| 6,621,125 B1 * | 9/2003 | Wang | 257/355 |
| 2003/0025816 A1 | 2/2003 | Sakuragi | |

OTHER PUBLICATIONS

Translated German Office Action mailed Jun. 30, 2006 (15 pgs.)
I. Bloom et al., American Institute of Physics pubication entitled "1/f Noise Reduction of Metal-Oxide-Semiconductor Transistors by Cycling from Inversion to Accumulation," pp. 1664-1666; August 15, 1990.
S. Mendis et al., IEEE Journal of Solid-State Circuits publication entitled "CMOS Active Pixel Image Sensors for Highly Integrated Imaging Systems," vol. 32, No. 2; pp. 187-197; Feb. 1997.
E. A.M. Klumperink et al., IEEE Journal of Solid-State Circuits publication entitled "Reducing MOSFET 1/f Noise and Power Consumption by Switched Biasing," vol. 35, No. 7; pp. 994-1001; Jul. 2000.
H. Tian et al., Proceedings of SPIE publication entitled "Analysis of 1/f Noise in CMOS APS," vol. 3965; pp. 168-176; 2000.
H. Tian et al., IEEE Transactions on Circuits and Systems—II: Analog and Digital Signal Processing publication entitled "Analysis of 1/f Noise in Switched MOSFET Circuits"; vol. 48, No. 2; pp. 151-157; Feb. 2001.
Eastman Kodak Company DS00-001 application note entitled "Solid State Image Sensors Technology"; 55 pgs.; © Dec. 8, 1994.
Klumperink et al. article entitled "Reducing MOSFET 1/f Noise and Power Consumption by Switched Biasing" for IEEE Journal of Solid-State Circuits, Vo. 35, No. 7; Jul. 2000.
E. R. Fossum web article entitled "CMOS Image Sensors Combat Noise" for EETimes; 2 pgs; May 3, 2002.

* cited by examiner

Primary Examiner—Tuan Ho
Assistant Examiner—Tuan H Le
(74) Attorney, Agent, or Firm—RatnerPrestia

(57) ABSTRACT

A CMOS image sensor includes a plurality of pixel circuits. Each pixel circuit includes a plurality of transistors. The image sensor includes a controller for controlling operation of the plurality of pixel circuits, wherein the controller is configured to cause at least one of the transistors in each pixel circuit to be placed in an accumulation mode and then switched from the accumulation mode to a strong inversion mode, thereby reducing 1/f noise of the pixel circuits.

17 Claims, 5 Drawing Sheets

//  CMOS IMAGE SENSOR WITH REDUCED 1/F NOISE

THE FIELD OF THE INVENTION

This invention relates generally to CMOS image sensors, and relates more particularly to a CMOS image sensor with reduced 1/f noise.

BACKGROUND OF THE INVENTION

One type of prior art image sensor is an active pixel sensor (APS) image sensor. APS image sensors are typically fabricated using Complimentary Metal Oxide Semiconductor (CMOS) processing technology, and are also typically referred to as CMOS image sensors. CMOS image sensors sense light by converting incident light (photons) into electronic charge (electrons) via the photoelectric effect. Color CMOS image sensors are typically made by coating each individual pixel with a filter color (e.g. red, green, and blue). CMOS image sensors typically include a photo sensor (e.g., photodiode) and several CMOS transistors for each pixel. Some CMOS image sensors provide integrated analog-to-digital conversion and full timing control on a single integrated circuit.

Existing CMOS image sensors include three-transistor (3T) and four-transistor (4T) pixel implementations. Pixel implementations with more than four transistors have also been developed. The pixel circuits in these image sensors typically include a source follower transistor that is used to buffer the photodiode voltage onto a column line. In CMOS image sensors with 4T pinned photodiode pixel implementations, read noise is typically dominated by the 1/f noise of the source follower transistor. 1/f noise, which is also referred to as flicker noise, has a spectral density that is inversely proportional to frequency (f). The 1/f noise of the source follower transistor is also a factor in 3T pixel implementations, although the 1/f noise is not typically dominant. Rather, in 3T pixel implementations, the read noise is typically dominated by "kTC" noise, which is the noise associated with resetting the pixel to a reset level. Nonetheless, 1/f noise from the source follower transistor provides a significant contribution to the overall noise in 3T pixel implementations.

Existing techniques for reducing the 1/f noise of a transistor include increasing the size of the transistor, or modifying the CMOS process. However, due to pixel size constraints in CMOS image sensors, the size of the source follower transistor cannot typically be increased. And modification of the CMOS process is typically complex and not a viable option.

SUMMARY OF THE INVENTION

One form of the present invention provides a CMOS image sensor that includes a plurality of pixel circuits. Each pixel circuit includes a plurality of transistors. The image sensor includes a controller for controlling operation of the plurality of pixel circuits, wherein the controller is configured to cause at least one of the transistors in each pixel circuit to be placed in an accumulation mode and then switched from the accumulation mode to a strong inversion mode, thereby reducing 1/f noise of the pixel circuits.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
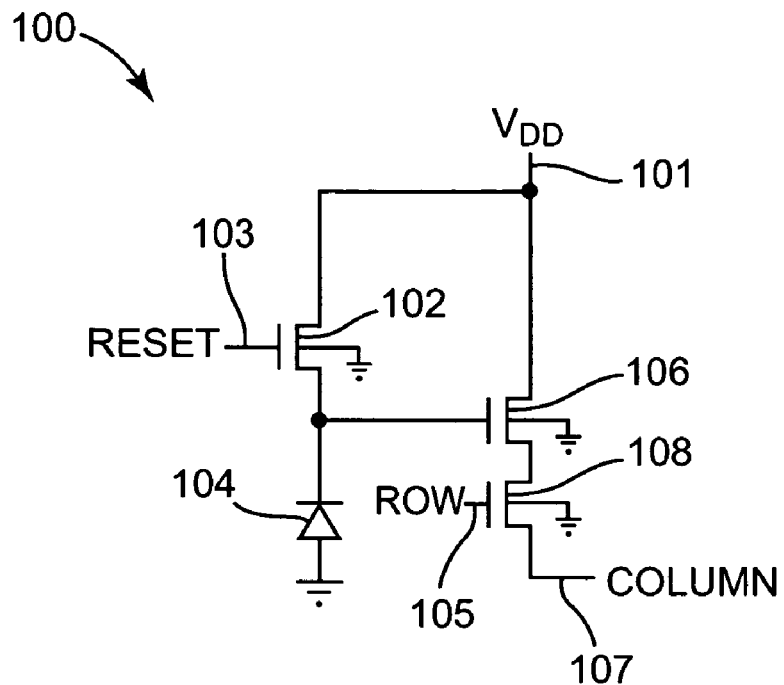
FIG. 1 is a schematic diagram illustrating a prior art three-transistor (3T) pixel circuit for a CMOS image sensor.

FIG. 1 is a schematic diagram illustrating a prior art three-transistor (3T) pixel circuit 100 for a CMOS image sensor. Pixel circuit 100 includes transistors 102, 106, and 108, and photodiode 104. Transistors 102, 106, and 108 are typically NMOS field effect transistors (FETs). The drain of transistor 102 is connected to voltage supply line 101 ($V_{DD}$). The gate of transistor 102 is connected to a RESET line 103. The source of transistor 102 is connected to photodiode 104 and to the gate of transistor 106. In addition to being connected to the source of transistor 102, photodiode 104 is also connected to ground. The drain of transistor 106 is connected to voltage supply line 101 ($V_{DD}$). The source of transistor 106 is connected to the drain of transistor 108. The gate of transistor 108 is connected to a ROW line 105. The source of transistor 108 is connected to a COLUMN line 107. The bodies (substrates) of transistors 102, 106, and 108 are connected to ground.

Transistor 102 is a reset transistor that is used to reset the photodiode 104 voltage. Transistor 106 is a source follower transistor for sensing and buffering the photodiode voltage. Transistor 108 is a selection transistor that is used to select pixel circuit 100. Pixel information from a CMOS image sensor is typically sampled in rows. To select a row of pixels, the ROW line 105 is set high for the pixel circuits 100 in the desired row. To reset a row of pixels, the RESET line 103 is set high for the selected row of pixel circuits 100.

Pixel information for pixel circuit 100 is typically generated and sampled in three phases: (1) reset, (2) integration, and (3) readout. During the reset phase, pixel circuit 100 is reset by setting the RESET line 103 high (e.g., above $V_{DD}$). Setting the RESET line 103 high turns on transistor 102, and sets the voltage across the photodiode 104 to a fixed starting value. The RESET line 103 is then set low (e.g., ground), thereby turning transistor 102 off, and beginning the integration phase. While the RESET line 103 is low, pixel circuit 100 integrates the amount of light focused onto photodiode 104, and photodiode 104 discharges from the reset level downward. At the end of the integration phase, the ROW line 105 is typically set high to start the readout phase. Setting the ROW line 105 high turns on transistor 108 and passes the integration voltage on photodiode 104 onto the COLUMN line 107. During the readout phase, the reset voltage and the integration voltage are typically read from COLUMN line 107. The image signal generated by each pixel circuit 100 is typically the difference between the reset voltage and the voltage on the photodiode 104 after the integration period (i.e., the integration voltage).

Figure 2:
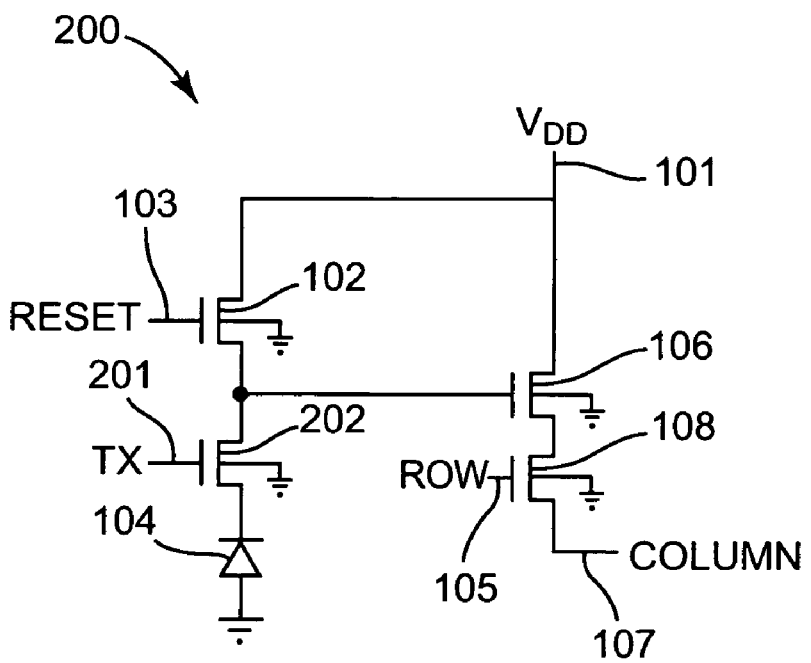
FIG. 2 is a schematic diagram illustrating a prior art four-transistor (4T) pixel circuit for a CMOS image sensor.

FIG. 2 is a schematic diagram illustrating a prior art four-transistor (4T) pixel circuit 200 for a CMOS image sensor. As shown in FIG. 2, the 4T pixel circuit 200 is typically configured in the same manner as the 3T pixel circuit 100 shown in FIG. 1, with the exception that a fourth transistor 202 has been added in series with the photodiode 104. The source of transistor 202 is connected to the source of transistor 102 and to the gate of transistor 106. The gate of transistor 202 is connected to TX (TRANSFER) line 201. The drain of transistor 202 is connected to photodiode 104. Transistor 202 is typically an NMOS FET. The bodies (substrates) of transistors 102, 106, 108, and 202 are connected to ground.

The 4T pixel circuit 200 typically uses the same three phases (i.e., reset, integration, and readout) as the 3T pixel circuit 100 (FIG. 1). During the reset phase, pixel circuit 200 is reset by setting the RESET line 103 and the TX line 201 high (e.g., above $V_{DD}$). Setting lines 103 and 201 high causes transistors 102 and 202 to turn on, and sets the voltage across the photodiode 104 to a fixed starting value. The RESET line 103 and the TX line 201 are then set low (e.g., ground), thereby turning transistors 102 and 202 off, and beginning the integration phase. During the integration phase, photodiode 104 discharges from the reset level downward. At the end of the integration phase, the TX line 201 is set high to start the readout phase. Setting the TX line 201 high turns on transistor 202, and causes the charge on the photodiode 104 to be transferred to the parasitic capacitance at the node connected to the gate of transistor 106. The TX line 201 is then set low, thereby turning off transistor 202, and the ROW line 105 is set high. Setting the ROW line 105 high transfers the integration voltage to the COLUMN line 107.

As described above in the Background of the Invention section, 1/f noise of the source follower transistor (e.g., transistor 106 in FIGS. 1 and 2) in CMOS image sensors is a significant, if not dominant, factor in the overall read noise of the sensor. Several different physical mechanisms are believed to contribute to 1/f noise in MOSFET's. One such mechanism, which is believed to play the most important role, is the existence of traps (surface traps) at the semiconductor-oxide (e.g., Si—$SiO_2$) interface of a MOSFET device. Trapping and detrapping of electrons by the surface traps can lead to electron number variations, and corresponding 1/f noise.

One form of the present invention reduces the 1/f noise of the source follower transistors in pixel circuits of a CMOS image sensor by dynamically passivating the surface traps. In one embodiment, the surface traps are dynamically passivated by placing the source follower transistor in accumulation mode (e.g., which occurs when the gate voltage ($V_g$) minus the bulk voltage ($V_b$) is less than one volt) before it is operated in strong inversion mode (e.g., $V_{gs}>V_{th}$). For an NMOS device, in the strong inversion mode, negative charges (electrons) are attracted to the channel region forming an n-type channel between the source and the drain, and conduction can occur between the source and the drain.

In the accumulation mode of an NMOS transistor, positive charges (holes) are attracted to the channel region, and only leakage current can flow between the source the drain. While the source follower transistor is in accumulation mode, the holes that are forced to the surface of the device passivate the surface traps. After the surface traps are passivated, the source follower transistor is then operated in the strong inversion mode. The surface traps remain passivated for a period of time after switching to the strong inversion mode, thereby reducing the 1/f noise of the source follower transistor while the surface traps remain passivated. Thus, 1/f noise is reduced in the strong inversion mode, by first placing the source follower transistor in the accumulation mode immediately before operating the transistor in the strong inversion mode.

Techniques for switching the source follower transistor between an accumulation mode and a strong inversion mode in pixel circuits of a CMOS image sensor according to embodiments of the present invention are described in further detail below with reference to FIGS. 3-6.

Figure 3:
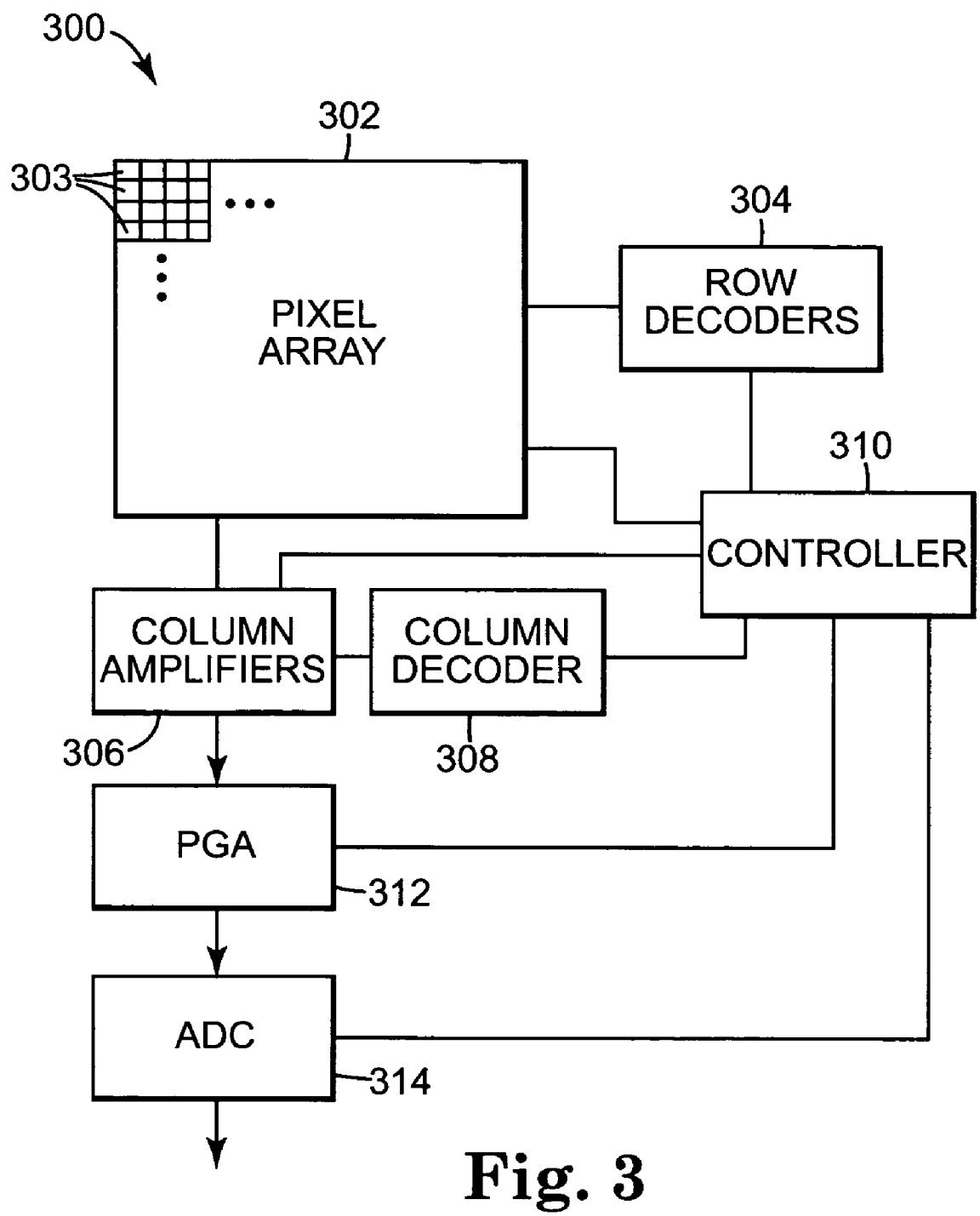
FIG. 3 is a block diagram illustrating major components of an image sensor according to one embodiment of the present invention.

FIG. 3 is a block diagram illustrating major components of an image sensor 300 according to one embodiment of the present invention. In one embodiment, image sensor 300 is an active pixel sensor (APS) image sensor, which is also referred to herein as a CMOS image sensor. In one embodiment, image sensor 300 is implemented with a single integrated circuit that provides integrated analog-to-digital conversion and timing control.

Image sensor 300 includes pixel array 302, row decoders 304, column amplifiers 306, column decoder 308, controller 310, programmable gain amplifier (PGA) 312, and analog-to-digital converter (ADC) 314. Pixel array 302 includes a plurality of pixel circuits (pixels) 303, with each pixel circuit 303 providing one pixel of image information. The pixel circuits 303 in pixel array 302 are organized into a plurality of rows and a plurality of columns (e.g., 480×640).

Controller 310 is connected to pixel array 302, row decoders 304, column amplifiers 306, column decoder 308, programmable gain amplifier 312, and analog-to-digital converter 314. Controller 310 generates control signals for controlling the operation of sensor 300, including signals to initiate, maintain, and stop image capture processes.

In one form of the invention, column amplifiers 306 include one column amplifier for each column of pixels 303 in array 302, and pixel information from pixel array 302 is sampled in rows. The sampling time for each row of pixels is referred to as a row sample interval. A row of pixels 303 in pixel array 302 is selected by row decoders 304. To select a row of pixels, row decoders 304 assert a ROW line high for the pixel circuits 303 in the desired row. To reset a row of pixels, row decoders 304 assert a RESET line high for a selected row of pixel circuits 303. Row decoders 304 are controlled by controller 310, which indicates to row decoders 304 when to set the ROW line and the RESET line high or low.

During an integration phase, pixel circuits 303 integrate the amount of light directed onto their photodiodes, and output integrated voltages (Vs). Column amplifiers 306 act as an analog buffer that samples and holds the outputs of a selected row of pixels 303. At the end of the integration phase, and during a readout phase, column amplifiers 306 sample the integrated signal levels (Vs) from a selected row of pixels 303, and sample a reset level (Vr) output by the selected row of pixels 303.

In one embodiment, the image signal generated by each pixel circuit 303 is the difference between the sampled reset voltage level (Vr) and the sampled integration voltage level (Vs) obtained after the integration period. At the end of a row sample interval, the difference between the reset signal levels (Vr) and integrated signal levels (Vs) is held on the outputs of column amplifiers 306. During a column processing interval, column amplifiers 306 are sequentially selected by column decoder 308 to output the corresponding held level.

Programmable gain amplifier 312 amplifies the analog signals output by column amplifiers 306, and outputs the amplified signals to analog-to-digital converter 314. Controller 310 controls the gain of amplifier 312. Analog-to-digital converter 314 digitizes the analog signals received from amplifier 312, and outputs digital pixel data.

In one embodiment, each pixel circuit 303 includes a source follower transistor that is configured to be switched between an accumulation mode and a strong inversion mode based on control signals generated by controller 310, as described in further detail below with reference to FIGS. 4-6.

Figure 4:
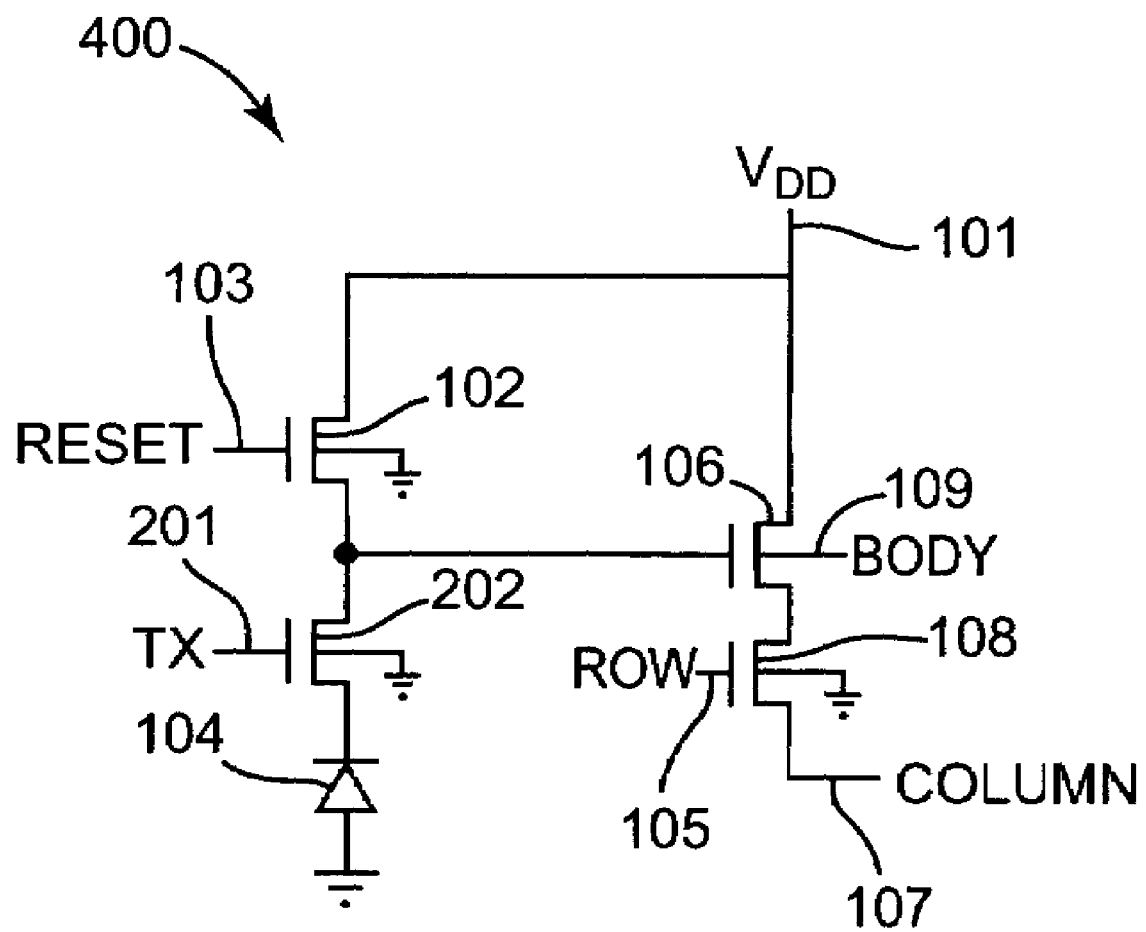
FIG. 4 is a schematic diagram illustrating a four-transistor (4T) pixel circuit with reduced 1/f noise according to one embodiment of the present invention.

FIG. 4 is a schematic diagram illustrating a four-transistor (4T) pixel circuit 400 with reduced 1/f noise according to one embodiment of the present invention. Pixel circuit 400 represents one of the pixels 303 in image sensor 300 (FIG. 3) according to one embodiment. Pixel circuit 400 includes four transistors 102, 106, 108, and 202, which are configured in the same manner as shown in FIG. 2, with the exception that the body (substrate) of transistor 106 in pixel circuit 400 is tied to BODY line 109, rather than to ground as shown in FIG. 2. In one embodiment, transistors 102, 106, 108, and 202 are NMOS FET's. In one form of the invention, photodiode 104 is a pinned photodiode, a buried photodiode, or a standard photodiode.

In one embodiment, the source follower transistor 106 in pixel circuit 400 is an NMOS surface channel transistor. In the embodiment illustrated in FIG. 4, the source follower transistor 106 in pixel circuit 400 is configured to be switched between an accumulation mode and an strong inversion mode based on control signals received from controller 310 (FIG. 3). The operation of the pixel circuit 400 shown in FIG. 4 is described in further detail below with reference to FIG. 5.

Figure 5:
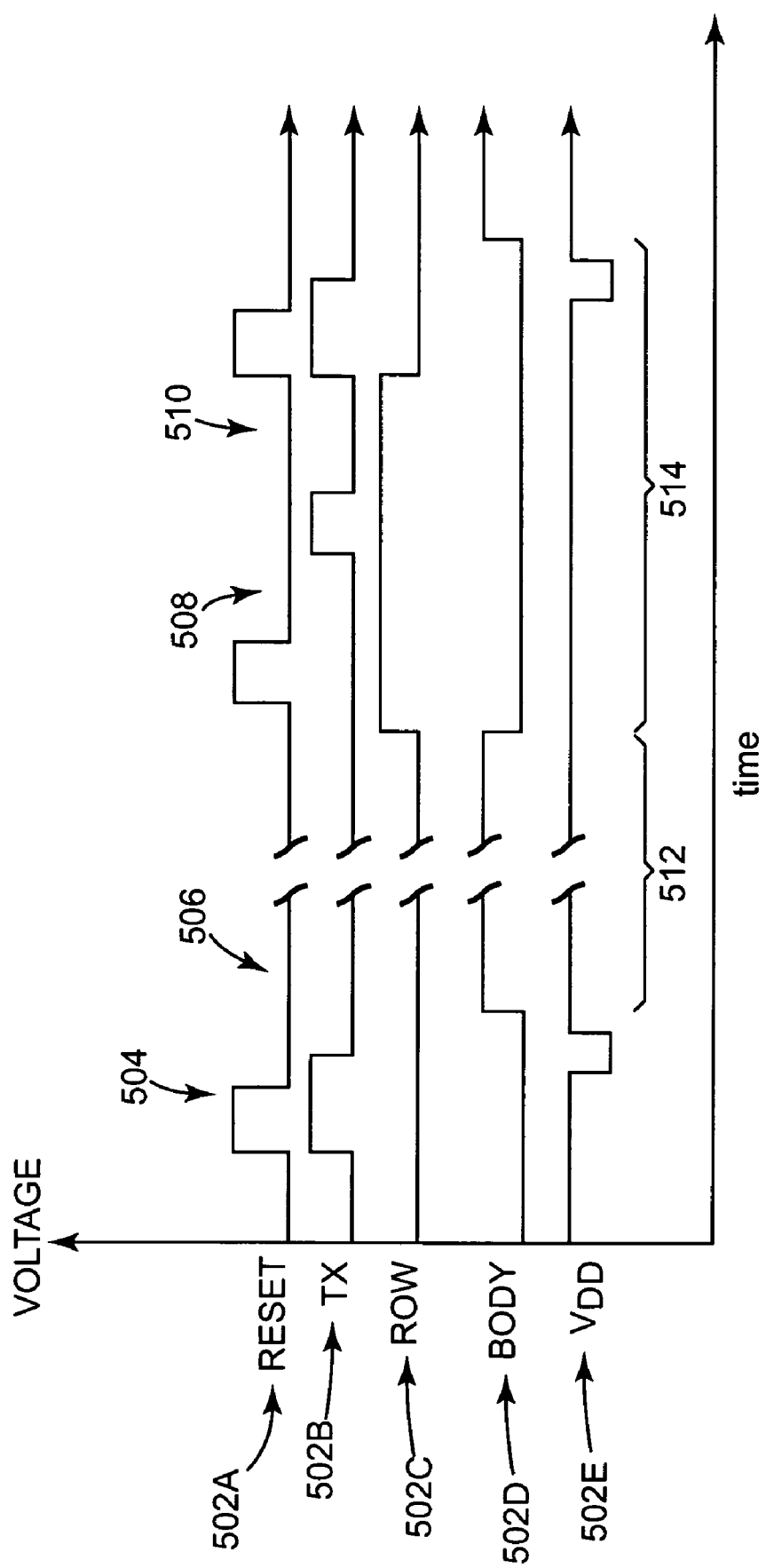
FIG. 5 is a timing diagram illustrating the timing of control signals for the pixel circuit shown in FIG. 4 according to one embodiment of the present invention.

FIG. 5 is a timing diagram illustrating the timing of control signals 502 for the pixel circuit 400 shown in FIG. 4 according to one embodiment of the present invention. The control signals include a RESET signal 502A, a TX (TRANSFER) signal 502B, a ROW signal 502C, a BODY signal 502D, and a $V_{DD}$ signal 502E (collectively referred to as control signals 502). In one embodiment, controller 310 (FIG. 3) is configured to generate the control signals 502 to control the operation of pixel circuit 400. RESET signal 502A represents the voltage over time on RESET line 103. TX signal 502B represents the voltage over time on TX line 201. ROW signal 502C represents the voltage over time on ROW line 105. BODY signal 502D represents the voltage over time on BODY line 109. $V_{DD}$ signal 502E represents the voltage over time on the $V_{DD}$ power supply line 101.

In one embodiment, pixel circuit 400 uses the same three phases as pixel circuits 100 and 200 (i.e., reset, integration, and readout). Four different points in time 504-510 are identified in FIG. 5. At time 504, which corresponds to the reset phase, the RESET signal 502A and the TX signal 502B are high (e.g., above $V_{DD}$), and the ROW signal 502C and the BODY signal 502D are low (e.g., ground). Thus, at time 504, transistors 102, 106, and 202 are on, and transistor 108 is off. During the reset phase, the voltage across the photodiode 104 is set to a fixed starting value.

At the end of the reset phase, $V_{DD}$ 502E is pulsed low, the RESET signal 502A and the TX signal 502B are set low, the BODY signal 502D is set high, and the integration phase begins. $V_{DD}$ 502E is pulsed low to pull the voltage at the gate of transistor 106, which is referred to as the floating diffusion node, to ground. At time 506, which corresponds to the integration phase, transistors 102, 106, 108, and 202 are off, and photodiode 104 discharges from the reset level downward. Transistor 106 is off because the high signal on the BODY line 109, which is coupled to the body of transistor 106, causes transistor 106 to be forced into an accumulation mode. In one embodiment, the BODY line 109 is set to $V_{DD}$ to force transistor 106 into the accumulation mode. The time period that transistor 106 is off and in the accumulation mode is identified in FIG. 5 by reference number 512, which corresponds to the time period that the BODY line 109 is high. The length of the integration phase can be varied, which is indicated in FIG. 5 by the break or gap in signals 502A-502E.

At the end of the integration phase, the BODY line 109 is set low (e.g., ground) and the ROW line 105 is set high, thereby turning on transistors 106 and 108, and causing transistor 106 to operate in the strong inversion mode. The time period that transistor 106 is on and operating in the strong inversion mode is identified in FIG. 5 by reference number 514, which corresponds to the time period that the BODY line 109 is low. The beginning portion of time period 514 corresponds to the readout phase. During the readout phase, the RESET signal 502A is pulsed high, turning on transistor 102 and causing a reset voltage to be output to the COLUMN line 107, where it is sampled by column amplifiers 306 (FIG. 3) at time 508. The TX signal 502B is then pulsed high, turning on transistor 202 and causing the integration voltage to be output to the COLUMN line 107, where it is sampled by column amplifiers 306 at time 510. At the end of the readout phase, the RESET signal 502A and the TX signal 502B are set high, and ROW signal 502C is set low, thereby starting another reset phase, and the process is repeated.

Thus, as described above, in one form of the invention, the source follower transistor 106 is switched between an accumulation mode and a strong inversion mode. In one embodiment, transistor 106 is operated in the accumulation mode during the reset and integration phases, and is operated in the strong inversion mode during the readout phase. By operating the transistor 106 in the accumulation mode before the readout phase, and then switching the transistor 106 to the strong inversion mode for the readout phase, the 1/f noise of the pixel circuit 400 during the readout phase is reduced.

The techniques described above for switching the source follower transistor 106 between an accumulation mode and a strong inversion mode are also applicable to a 3T pixel circuit 100 like that shown in FIG. 1. For example, the body of transistor 106 in pixel circuit 100 can be tied to the BODY line 109, rather than being tied to ground. In other embodiments, the techniques described herein may be applied to pixel circuits with any number of transistors, including pixel circuits with more than four transistors.

Figure 6:
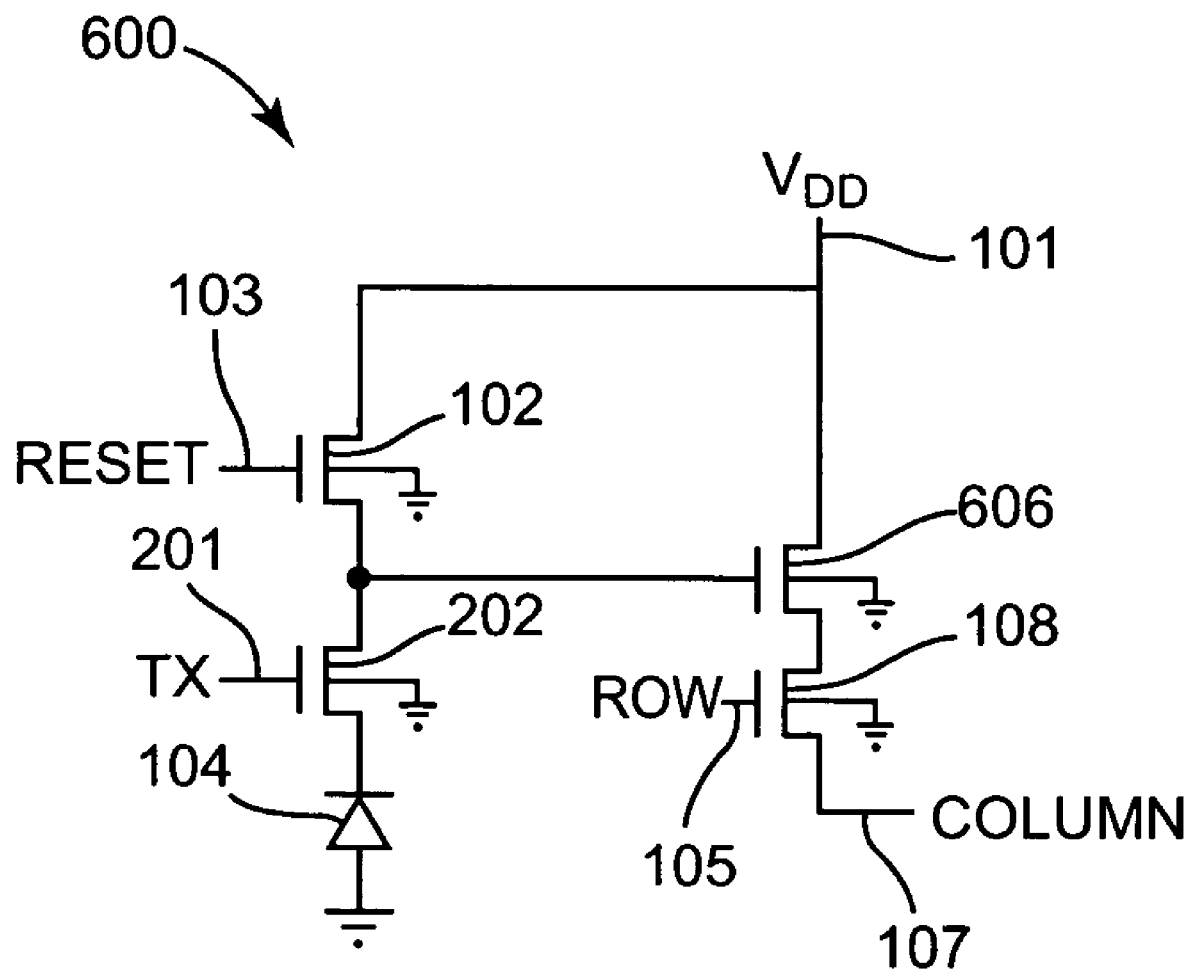
FIG. 6 is a schematic diagram illustrating a four-transistor (4T) pixel circuit with reduced 1/f noise according to another embodiment of the present invention.

FIG. 6 is a schematic diagram illustrating a four-transistor (4T) pixel circuit 600 with reduced 1/f noise according to another embodiment of the present invention. Pixel circuit 600 represents one of the pixels 303 in image sensor 300 (FIG. 3) according to one embodiment. Pixel circuit 600 includes four transistors 102, 606, 108, and 202, which are configured in the same manner as shown in FIG. 2, with the exception that transistor 106 in FIG. 2 has been replaced by transistor 606. In one embodiment, transistors 102, 606, 108, and 202 are NMOS FET's. In one form of the invention, photodiode 104 is a pinned photodiode, a buried photodiode, or a standard photodiode.

In one embodiment, the source follower transistor 606 in pixel circuit 600 is an NMOS surface channel transistor with a polysilicon P+ gate. A P+ gate is a gate that is highly doped (indicated by the plus sign) p-type. In conventional pixel circuits, such as those shown in FIGS. 1 and 2, the NMOS transistors 102, 106, 108, and 202, typically all have N+ gates, which are highly doped n-type gates. In conventional circuits with PMOS transistors, the PMOS transistors typically include P+ gates.

The P+ gate of the NMOS transistor 606 in pixel circuit 600 causes the transistor 606 to switch between an accumulation mode and a strong inversion mode based on control signals received from controller 310 (FIG. 3). In one embodiment, pixel circuit 600 uses the same control signals 502 (FIG. 5) as the pixel circuit 400 (FIG. 4), but the BODY signal 502D is not used for pixel circuit 600. Rather, in the illustrated embodiment of pixel circuit 600, the body of transistor 606 is tied to ground, as are the bodies of transistors 102, 108, and 202. The BODY signal 502D is not needed in the illustrated embodiment of pixel circuit 600, as the use of the P+ gate in the NMOS source follower transistor 606 provides the desired switching between the accumulation mode and the strong inversion mode to reduce the 1/f noise.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A CMOS image sensor, comprising:
a plurality of pixel circuits, each pixel circuit including a plurality of transistors; and
a controller for controlling operation of the plurality of pixel circuits,
wherein the controller is configured to generate at least: (1) a first voltage level during an integration phase at a body of at least one of the transistors in each pixel circuit; and (2) a second voltage level, different from the first voltage level, during a readout phase at the body of the at least one of the transistors in each pixel circuit to switch the at least one of the transistors in each pixel circuit between an accumulation mode during the integration phase and a strong inversion mode during the readout phase, thereby reducing 1/f noise of the pixel circuits.

2. The CMOS image sensor of claim 1, wherein the at least one of the transistors switched to the accumulation mode include a transistor that is configured as a source follower.

3. The CMOS image sensor of claim 1, wherein the at least one of the transistors in each pixel circuit in the accumulation mode is placed in the accumulation mode by increasing a voltage at the body thereof.

4. The CMOS image sensor of claim 1, wherein the controller is configured to alternate the first and second voltage at the body of the at least one of the transistors in each pixel circuit synchronized with a beginning time and an ending time of the readout phase, respectively, to switch the at least one of the transistors between the accumulation mode and the strong inversion mode.

5. The CMOS image sensor of claim 1, wherein one or more other bodies of a portion of the transistors in each pixel circuit are connected to ground.

6. The CMOS image sensor of claim 5, wherein the transistors in each pixel circuit connected to ground NMOS transistors with highly-doped p-type gates.

7. A method of controlling pixel circuits of a CMOS image sensor, each pixel circuit including a source follower transistor, the method comprising:

biasing, by a controller, a body of the source follower transistor in each pixel circuit to a first voltage level during an integration phase;
switching the source follower transistors between an accumulation mode during the integration phase and a strong inversion mode during a readout phase by biasing the body of the source follower transistor in each pixel circuit during a readout phase to a second voltage level lower than the first voltage level; and
reading signals from the pixel circuits when the source follower transistors are operated in the strong inversion mode.

8. The method of claim 7, wherein the source follower transistors are operated in the accumulation mode during the reset phase of the pixel circuits.

9. The method of claim 7, wherein the biasing of the body of the source follower transistor in each pixel circuit to one of the first voltage level during the integration phase or the second voltage level during the readout phase includes forcing each respective source follower transistor into the accumulation mode by increasing a voltage level at the body of the respective source follower transistor.

10. The method of claim 9, wherein the forcing of each respective source follower transistor into the accumulation mode includes sending a control signal from the controller of the CMOS image sensor to the respective source follower transistor.

11. The method of claim 9, wherein the forcing of each respective source follower transistor into the accumulation mode includes switching to the strong inversion mode by varying a voltage level at the body of the respective source follower transistor to correspond to the second voltage level.

12. The method of claim 7, wherein a portion of the transistors in each pixel circuit are NMOS transistors with highly-doped p-type gates and each with a body connected to ground.

13. An active pixel sensor (APS) image sensor comprising:
a plurality of pixel circuits, each pixel circuit including a transistor configured as a source follower; and
a controller for biasing a body of the source follower transistor in each pixel circuit to a first voltage level during integration and reset phases and a second voltage level, different from the first voltage level, during a readout phase to switch the source follower transistors between an accumulation mode during the integration and reset phases and a strong inversion mode during the readout phase, thereby reducing 1/f noise of the pixel circuits during the readout phase.

14. The APS image sensor of claim 13, wherein the source follower transistors are placed in the accumulation mode by increasing a voltage at the body of the source follower transistor in each pixel circuit.

15. The APS image sensor of claim 13, wherein the controller is configured to alternate between the first and second voltage levels at the body of each of the source follower transistors to switch the source follower transistors between the accumulation mode and the strong inversion mode.

16. The APS image sensor of claim 13, wherein a body of a portion of the transistors in each pixel circuit is connected to ground.

17. The APS image sensor of claim 16, wherein the portion of the transistors in each pixel circuit connected to ground are NMOS transistors with highly-doped p-type gates.

* * * * *

UNITED STATES PATENT AND TRADEMARK OFFICE
CERTIFICATE OF CORRECTION

| | |
|---|---|
| PATENT NO. | : 7,432,968 B2 |
| APPLICATION NO. | : 10/842303 |
| DATED | : October 7, 2008 |
| INVENTOR(S) | : Fowler |

It is certified that error appears in the above-identified patent and that said Letters Patent is hereby corrected as shown below:

In column 7, line 61, in Claim 6, after "ground" insert -- are --.

Signed and Sealed this

Twenty-fourth Day of March, 2009

JOHN DOLL
*Acting Director of the United States Patent and Trademark Office*